United States Patent

Klaue

[15] 3,691,869
[45] Sept. 19, 1972

[54] VARIABLE SPEED HYDRAULIC TRANSMISSION

[72] Inventor: Hermann Klaue, Case Pastale 151, 1820 Montreux, Switzerland

[22] Filed: June 25, 1970

[21] Appl. No.: 49,626

[52] U.S. Cl. ................74/740, 74/331, 192/85 CA, 192/87.11, 192/87.17, 192/109 F
[51] Int. Cl. .......................F16h 37/00, F16d 25/06
[58] Field of Search..74/740; 192/87.11, 109 F, 85 CA, 192/87.17

[56] References Cited

UNITED STATES PATENTS

| | | | |
|---|---|---|---|
| 2,169,639 | 8/1939 | Grote | 192/87.11 |
| 2,844,043 | 7/1958 | Hobbs | 192/109 F X |
| 3,313,171 | 4/1967 | Nagasaki | 192/87.14 X |
| 3,396,610 | 8/1968 | Rich, Jr. et al. | 74/740 |
| 2,699,689 | 1/1955 | Ahlen | 74/740 X |
| 2,055,970 | 9/1936 | Fippard | 192/85 CA X |
| 2,406,417 | 8/1946 | Viviano | 192/87.17 X |
| 2,701,042 | 2/1955 | Kurzweil | 192/85 CA UX |
| 3,256,542 | 6/1966 | Schubert | 192/87.17 X |

*Primary Examiner*—Arthur T. McKeon
*Attorney*—Larson, Taylor & Hinds

[57] ABSTRACT

A variable speed transmission connecting an input shaft to an output shaft and including at least one rotating clutch. The clutch is operated by hydraulic pressure fluid delivered to and removed from the outer circumferential periphery of the clutch. Preferably, a plurality of these clutches are arranged on a main shaft of the transmission, and one or more of these clutches may be double clutches, that is, two separate clutches connected to a common coupling member. A secondary shaft operatively engaged with the input shaft includes gears for operating selected ones of said clutches. A turbine blade may be provided between the input shaft and the clutches and a planetary gear brake may be provided between the clutches and the output shaft.

9 Claims, 5 Drawing Figures

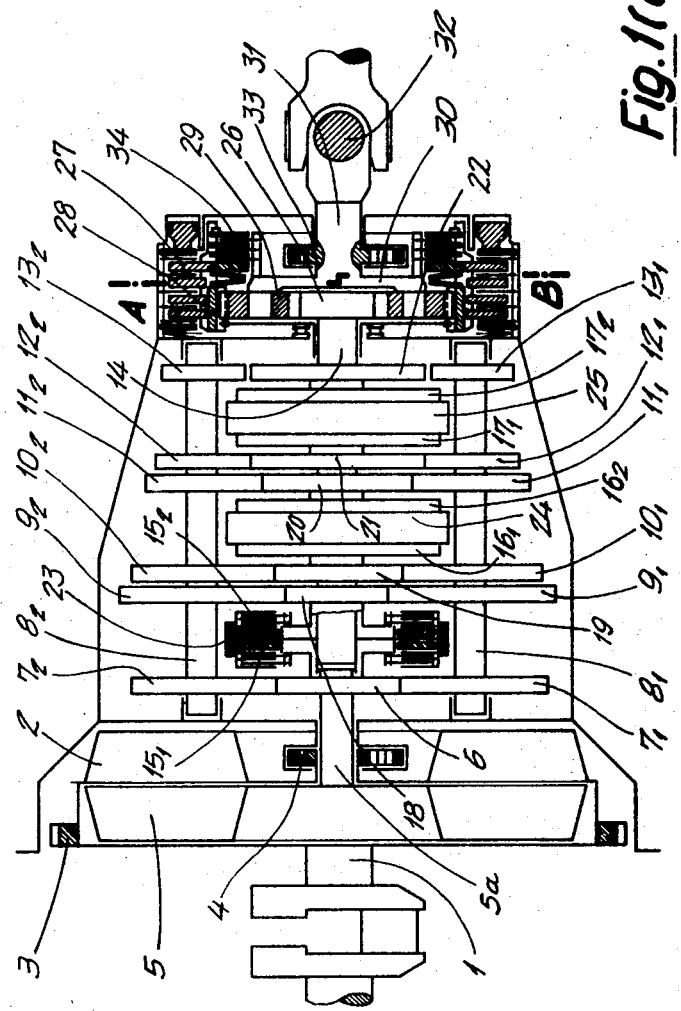

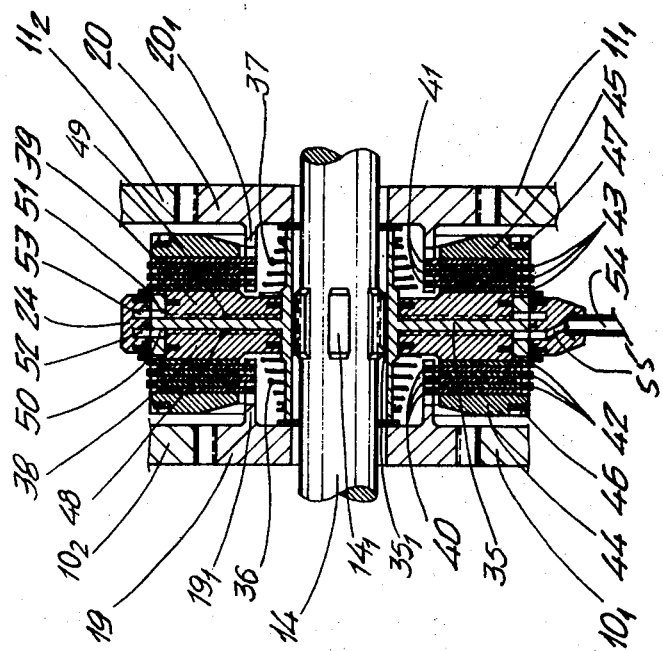
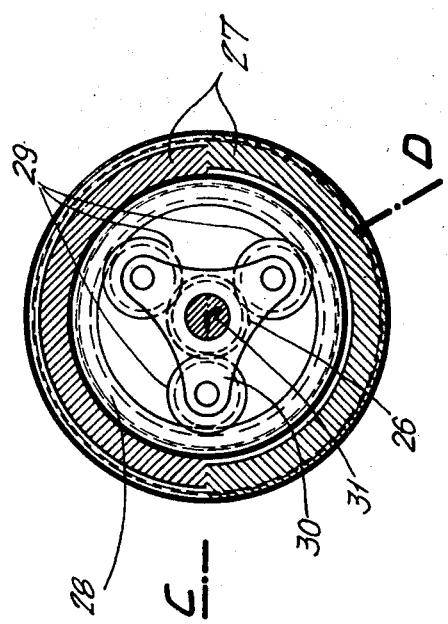

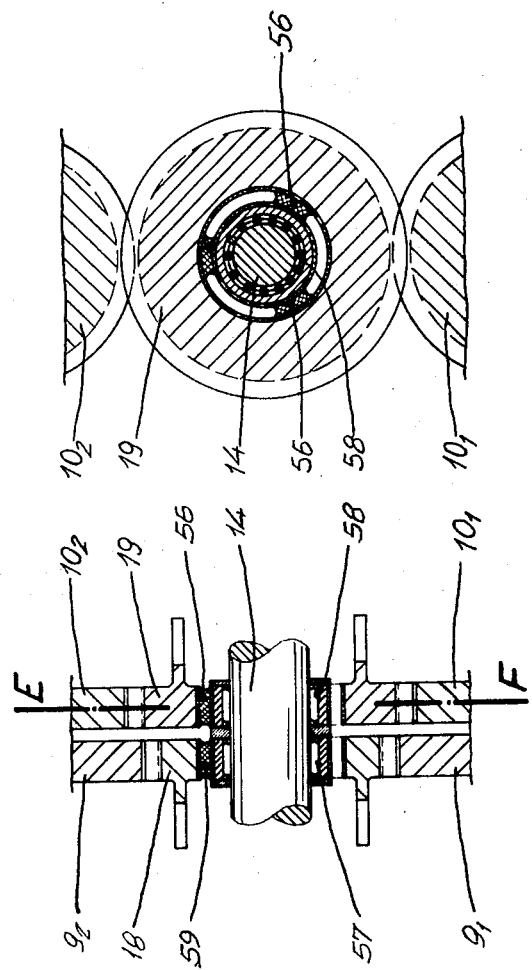

VARIABLE SPEED HYDRAULIC TRANSMISSION

BACKGROUND OF THE INVENTION

This invention relates to variable speed transmissions, and in particular, it relates to a variable speed transmission including a hydraulically operated rotating friction clutch between the input shaft and the output shaft, preferably for use on motor vehicles.

Certain engines such as Otto engines and Diesel engines as well as combustion turbines use torque converters when used on motor vehicles. The piston engines require torque converters because of their own low torque characteristics while combustion turbines require torque converters because of the high centrifugal force developed by their propeller shafts. Step gear transmissions are actually more advantageous from an efficiency point of view. In the United States, passenger car transmissions are primarily of the two-to-four clutch-brake actuated planetary gear type with hydrodynamic converters between the engine and the transmission. Synchronous change speed transmissions with friction main clutches are presently used only in Europe and Japan. However, in the United States, the use of hydrodynamic converters is practically nil except for use on trucks and buses.

Recently conducted studies of standard city-type buses equipped with either normal change-speed gears or hydrodynamic converted change-speed gears have shown that with regard to gasoline consumption, the normal change-speed gears are quite superior. In terms of gasoline consumption, the savings is up to 36 percent. This difference in operating efficiency is not quite as important with regard to passenger cars because of the narrower range of speed. However, even in the case of passenger cars, the normal change-speed gears have been shown to be 8 to 12 percent more efficient than hydrodynamic converter change-speed gears.

The loss of power which results when a hydrodynamic converter is arranged between the engine and the transmission originates from the reduced efficiency of the hydrodynamic part of the converter range. Added thereto are losses caused by the overlapping of the torque of the clutch. The overlapping which occurs as the gears are changing steps is absorbed by the clutches and the brakes for changing gears as well as by the hydrodynamic part. Thus, the losses which occur are transformed into heat which is then dissipated into the transmission oil.

Thus, there exists a need for a transmission which eliminates these disadvantages by providing a high efficiency step gear for passenger cars as well as for trucks and buses. However, in the case of trucks and buses, if the converter is eliminated, additional gear steps in the transmission will be required. However, to maintain efficiency, the additional gear steps must not be accompanied by a torque overlapping in the clutches. Further, manual and automatic gear shifting should take place without actuating a disengaging clutch. Thus, it would appear that a hydraulic clutch having an efficiency of approximately 98 percent should be used.

In previously tried arrangements, the actuating oil for the hydraulic clutches has been supplied and removed through drill holes in the gear shaft. The considerable additional oil pressure that occurs because of the centrifugal effect at higher speed must be compensated for through compression springs in these clutches such that the time period required for disengagement of these clutches is reduced.

SUMMARY OF THE INVENTION

Thus, it is a purpose of this invention to provide a new and improved clutch type variable speed transmission which overcomes the disadvantages present in the prior art. According to the present invention, there is provided a variable speed transmission having a plurality of steps for varying the speed ratio between the input shaft and the output shaft, the transmission including at least one hydraulically operated rotating friction clutch.

In accordance with a main feature of the present invention, the pressurized hydraulic fluid is supplied to and removed from the clutch of the transmission by way of oil passages located about the outer circumferential periphery of the clutch. Preferably, annular oil housings are arranged about the clutch for providing passages from a high pressure area to the clutch and from the clutch to a low pressure area. Because of this arrangement, clutch disengagement occurs immediately as soon as a valve opens to release pressurized fluid from within the clutch.

The transmission includes a main shaft with which the hydraulic clutches are selectively drivingly engaged. A planetary gear-type clutch-brake is provided between the hydraulic clutches and the output shaft of the transmission. With this arrangement, it is possible to double the number of steps provided by the hydraulic clutches of the transmission.

In accordance with another feature of the invention, a hydrodynamic clutch is provided between the transmission input shaft and the hydraulic clutches.

In accordance with another feature of the invention, at least one, and preferably two, secondary shafts are arranged parallel with the main shaft, said secondary shafts having gears which are drivingly engaged with central gears freely on the main shaft for rotation relative to the main shaft, each said gear of the secondary shaft or shafts being arranged to operate through certain central gears to operate certain hydraulic clutches on the main shaft.

Each hydraulic clutch is preferably arranged as a double hydraulic clutch having two separately operated halves, each half operated by means of a different gear on the secondary shaft or shafts, and wherein either clutch half, when engaged, connects the secondary shaft or shafts to the main shaft through a common coupling member, for driving the main shaft.

One advantage of this arrangement is that it permits the use of thinner gears.

Thus, it is an object of this invention to provide a new and improved hydraulic clutch transmission which overcomes disadvantages of the prior art.

It is another object of this invention to provide a new and improved hydraulic clutch transmission having a large number of steps while concurrently providing a high operating efficiency.

It is another object of this invention to provide a new and improved hydraulic clutch transmission wherein the operating fluid for the clutch is supplied from the outer circumferential periphery of the clutch.

It is another object of this invention to provide a new and improved clutch having a large number of steps and operated efficiently, said clutch including a plurality of hydraulic clutches and a planetary gear type arrangement located between the hydraulic clutches and the output shaft of the transmission.

Other objects and advantages of the invention will become apparent form the detailed description to follow, together with the accompanying drawings.

BRIEF SUMMARY OF THE DRAWINGS

There follows a detailed description of a preferred embodiment of the invention to be read together with the accompanying drawings which are provided solely for purposes of illustration.

FIG. 1 is a longitudinal view of a transmission constructed in accordance with the present invention.

FIG. 2 is a cross-sectional view taken along line A–B of FIG. 1.

FIG. 3 is an enlarged view of a portion of FIG. 1.

FIG. 4 is an enlarged view of a portion of FIG. 3, showing details of the main shaft-gear bearing, and including also an adjacent gear on the main shaft.

FIG. 5 is a cross-sectional view taken along line E–F of FIG. 4.

DETAILED DESCRIPTION OF THE PREFERRED EMBODIMENT

In the detailed description to follow, like numerals represent like elements throughout the several views.

Referring to FIG. 1, the input shaft or crank-shaft 1 is connected through a flywheel 3 to a pump wheel 2 of a hydrodynamic clutch. This wheel 2 operates a gear pump 4 and also drives a turbine wheel 5 which acts through shaft 5a to drive a gear 6. The gear 6 meshes with gear $7_1$ and $7_2$ on secondary shafts $8_1$ and $8_2$, respectively. Also mounted on the shaft $8_1$ are gears $9_1$, $10_1$, $11_1$, $12_1$, and $13_1$. Similarly, gears $9_2$, $10_2$, $11_2$, $12_2$, and $13_2$ are fixedly mounted on the shaft $8_2$ for rotation therewith.

A main shaft 14 is aligned with but freely rotatably relative to shaft 5a or gear 6.

Mounted on main shaft 14 are three double clutches 15, 16, and 17. The clutch 15 includes two separately operated clutch portions $15_1$ and $15_2$. Similarly, the clutch 16 includes two portions $16_1$ and $16_2$ and the clutch 17 includes two portions $17_1$ and $17_2$. Also mounted on the main shaft 14, but freely rotatable relative thereto are gears 18, 19, 20, 21 and 22. Each of the gears 6, 18, 19, 20, 21 and 22 is associated with a given one of the clutch portions in a manner to be explained in greater detail below. For providing a reverse transmission, reversing wheels may be mounted between the gears $13_1$ and $13_2$ and the gear 22.

In a manner to be explained in greater detail below, each of the clutches 15, 16 and 17 include annular oil housings 23, 24, and 25 surrounding the outer periphery of the hydraulic clutches for providing a passage to supply pressurized fluid to and for removing fluid from their respective hydraulic clutches.

Between the hydraulic clutch 17 and the output shaft of the transmission, there is provided a planetary gear arrangement. See also FIG. 2. This arrangement includes a sun gear 26 surrounded by a plurality of planetary gears 29, the latter engaging an outer ring gear 28. A frame 30 engages the axes of the planetary gears 29 for rotation therewith about the axis of sun gear 26.

This planetary gear arrangement acts as a clutch-brake and is controlled by a first disc brake 27 which surrounds the ring gear and, then engaged, prevents rotation of the ring gear. When this disc brake 27 is released, the ring 28 is free to rotate. The planetary gear arrangement also includes a spring operated disc brake 34 which, upon release of the disc brake 27, is spring engaged such that rotation of the ring gear 28 acts through the brake 34 to operate a second oil pump 33. This oil pump supplies pressurized oil necessary for the shifting of gears when the vehicle is moving and the engine is stopped.

FIG. 3 is an enlarged view of the double clutch 16 including the two portions $16_1$ and $16_2$. As shown in the figure, the clutch includes a central coupling member 35 adapted to engage either one of the clutch portions $16_1$ or $16_2$ to the main shaft 14. At its inner periphery, the coupling member 35 includes a plurality of axially extending grooves $35_1$ for receiving splines $14_1$ on a shaft 14. Located on either side of the coupling member 35 are pistons 38 and 39, each urged against the coupling member 35 by means of conically shaped helical springs 36 and 37, respectively. The gears 19 and 20 each include axially extending projections $19_1$ and $20_1$ which projections are equipped with grooves for receiving therein and axially slidable thereto portions of axially movable discs 40 and 41, respectively. Mounted between the discs 40 are discs 42 and mounted between the discs 41 are discs 43. The discs 42 and 43 include outwardly projecting portions which engage, and are axially slidable relative to the outer portion of coupling member 35. Thus, when the discs 40 and 42 are engaged, a driving connection is provided from the gear 19 through elements $19_1$, 40, 42, and 35 to the shaft 14. Similarly, when the discs 41 and 43 are engaged a driving connection is provided from gear 20 to the shaft 14. The two other double clutches 15 and 17 operate in the same manner.

Referring again to FIG. 3, the clutch portions are provided with clutch covers 44 and 45 which are retained by retaining rings 46 and 47, respectively. To actuate either of these clutch portions, fluid is delivered to pressure chambers 48 or 49 behind the pistons 38 and 39, respectively, The annular oil housing 24 surrounds the clutch 16. Oil is supplied and removed to and from the clutch portion $16_1$ through an oil passage 54 which connects through a line 55 with an annular oil chamber 52. This in turn communicates through inwardly extending drill holes 50 with the chamber 48. Similarly, another inlet, not shown, supplies oil to the annular chamber 53 for delivery through drill holes 51 to the chamber 49.

FIGS. 4 and 5 show supports for freely supporting the gears 18 and 19 on shaft 14. The arrangement applies also to gears 20, 21 and 22. Antifriction bearings, such as roller bearings 57, 58 surround shaft 14. The connection between the external bearing ring of 57 and 58 and the gears is done by connecting elements 59 and 56, each of which consists of two concentric tubes between which rubber-elastic supports, interrupted in circumferential direction are arranged.

With this arrangement, by selecting which clutch portion to pressurize, and hence, engage, and by further selecting whether or not the brake 27 is to be actuated, a large number of gear steps may be provided. The following table illustrates how, with this arrangement, ten separate forward gear steps and two reverse gear steps may be selected.

| Gear Changing Step | Engaged Gears in Use | Clutch Portion Engaged; Clutch-Brake Portion Engaged |
|---|---|---|
| 1st forward gear | $6-7_1/7_2-12_1/12_2-21$ | $17_1;27$ |
| 2nd forward gear | $6-7_1/7_2-11_1/11_2-20$ | $16_1;27$ |
| 3rd forward gear | $6-7_1/7_2-10_1/10_2-19$ | $16_1;27$ |
| 4th forward gear |  | $15_1;27$ |
| 5th forward gear | $6-7_1/7_2-9_1-18$ | $15_2;27$ |
| 6th forward gear | $6-7_1/7_2-12_1 12_2-21$ | $17_1;34$(spring actuated) |
| 7th forward gear | $6-7_1/7_2-11_1/11_2-20$ | $16_1;34$(spring actuated) |
| 8th forward gear | $6-7_1/7_2-10_1/10_2-19$ | $16_1;34$(spring actuated) |
| 9th forward gear |  | $15_1;34$(spring actuated) |
| 10th forward gear | $6-7_1/7_2-9_1/9_2-18$ | $15_2;34$(spring actuated) |
| 1st reverse gear | $6-7_1/7_2-13_1/13_2-22$ | $17_2;27$ |
| 2nd reverse gear | $6-7_1/7_2-13_1/13_2-22$ | $17_2;34$(spring actuated) |

Although the invention has been described in considerable detail with respect to the preferred embodiment thereof, it will be apparent that the invention is capable of numerous modifications and variations apparent to those skilled in the art with departing from the spirit and scope of the invention.

I claim:

1. A variable speed transmission for changing the speed ratio between an input and output shaft comprising an input shaft, an output shaft, a variable speed transmission operatively connecting the input shaft to the output shaft, said transmission including at least one hydraulically operated rotating friction clutch, said friction clutch including a chamber which rotates with the clutch when the clutch is engaged, said chamber defined in part by a member responsive to the pressure in the chamber to engage the clutch, said chamber being further defined by a non-rotating stationary annular housing which surrounds said clutch member circumferentially, passage means for supplying hydraulic fluid to and for removing fluid from the said clutch chamber, said passage means connected to the interior of the annular oil housing to supply fluid to and remove from the outer circumferential periphery of the clutch chamber through the part thereof defined by said annular housing.

2. A transmission according to claim 1 including a plurality of said clutches arranged in series in said transmission between said input shaft and said output shaft.

3. A transmission according to claim 1 wherein said clutch is a double clutch comprising a central coupling member coupled to a main shaft of the transmission, a separately operated clutch on each axial side of said coupling member and said member responsive to the pressure in the chamber being a fluid operated piston, a said chamber being located between the coupling member and each said separately operated piston, and wherein said passage means includes means for supplying hydraulic fluid to either one of said chambers to operatively engage the coupling member with the main shaft.

4. A transmission according to claim 1 wherein said transmission includes a main shaft, said clutch connecting the input shaft to the main shaft, and including a planetary gear between the clutch and the output shaft, said main shaft being connected to a sun gear of the planetary gear, and the planet gears of the planetary gear being connected to the output shaft, and including a ring gear surrounding and engaged with the planetary gears.

5. A transmission according to claim 4 including a fluid operated brake for holding the said ring gear against rotation, and including a spring operated brake for connecting the ring gear with a means for operating a hydraulic pump connected to and operated by said output shaft.

6. A transmission according to claim 1 including a hydraulic turbine between the input shaft and the clutch.

7. A transmission according to claim 1 including a main shaft operatively connecting the clutch to the output shaft, and including at least one secondary shaft in driving engagement with the input shaft and with a central gear freely rotatably mounted on the main shaft, said secondary shaft including at least one gear fixed thereon and connected to said central gear whereby the input shaft is engaged with the output shaft through the secondary shaft and the clutch when that clutch is engaged.

8. A transmission according to claim 7 including a plurality of hydraulic clutches arranged in series on the main shaft, and wherein each said clutch is a double clutch comprising a central coupling member coupled to the main shaft of the transmission, a separately operated clutch on each axial side of said coupling member, and said member responsive to the pressure in the chamber being a fluid operated piston, a said chamber being located between the coupling member and each said separately operated piston, and wherein said passage means includes means for supplying hydraulic fluid to either one of said chambers to operatively engage the coupling member with the main shaft.

9. A transmission according to claim 7 including an antifriction bearing supporting the central gear on the main shaft, and including elastic support elements between the bearing and the inner periphery of the central gear.

* * * * *